March 4, 1969 N. FIORNASCENTE 3,431,333

METHOD FOR MAKING MECHANICALLY GROOVED PHONOGRAPH RECORDS

Filed Jan. 4, 1967

INVENTOR
NICOLA FIORNASCENTE
BY
Popper, Bain & Bobis
ATTORNEY

United States Patent Office 3,431,333

Patented Mar. 4, 1969

3,431,333

METHOD FOR MAKING MECHANICALLY GROOVED PHONOGRAPH RECORDS

Nicola Fiornascente, 165 Valley Road, Montclair, N.J. 07042

Filed Jan. 4, 1967, Ser. No. 607,870

U.S. Cl. 264—107

Int. Cl. B29d 17/00

5 Claims

ABSTRACT OF THE DISCLOSURE

The method for making mechanically grooved phonograph records in which a lacquer master disc is thinly plated; the tin plating is removed from the master lacquer disc and it is shaped to fit a pressing die; from this shaped, thinly plated master disc, which has been preshaped, a preshaped plated mold disc is prepared; the preshaped plated mold disc is removed from the plated master disc; a preshaped heavily plated stamper disc is prepared; the preshaped heavily plated stamper disc is removed from the plated mold and is placed without further deformation, since it is preshaped, in the pressing die and phonograph records are pressed therefrom.

*Backround of the invention*

The normal process of manufacturing mechanically grooved phonograph records, after several steps, produces a stamper disc. This plated stamper disc must be prepared between two extremes of thickness. If the plated stamper disc is too thin, when it is deformed to provide it with a center depression which defines a seat for a label, and arcuate edges, to define the rounded edge of a phonograph record, the plated stamper disc may crack or break. If it does not crack or break, it may be useful for pressing perhaps fifty or even five hunderd fifty phonograph records before it wears out. On the other hand, if the plated stamper disc is plated to a great thickness, when it is deformed to fit the pressing die, by reason of the increased thickness of the stamper disc, it is much more prone to cracking. If it does not crack, by reason of its thickness, its life is extended and it may be useful to press approximately five hundred fifty phonograph records. Thus, the technician who prepares the stamper disc is constantly seeking the happy medium thickness for the plated stamper disc which will result in a disc which is thick enough to be useful in preparing at least five hundred fifty phonograph records, and yet is thin enough to permit it to be preshaped to fit the pressing die without cracking or breaking during the shaping procedure. Many long hours of plating and expensive labor are lost by reason of the fracture of the plated stamper discs.

It has been found that it is not necessary to seek to form a plated stamper disc having the critical thickness which will permit it to be shaped to fit the pressing die without cracking and yet be sturdy enough to produce numerous pressings of phonograph records.

The conventional procedure involves transferring a tape recording to a lacquer master disc by means of a cutting lathe. The lacquer master disc is then electroplated and a plated master disc is thereby formed. The plated master disc is again plated resulting in the production of a plated mold disc. The plated mold disc may be repeatedly used for the production of as many plated stamper discs as may be required. In the plating of the mold disc to produce the plated master disc, the critical thickness of the plating producing the plated stamper disc is the problem area. Because after the plated stamper disc is prepared to the chosen thickness, in the conventional procedure the plated stamper disc is placed in a pressing die to deform it with a center depression defining a seat for the record label and with crimped edges defining the rounded edges of the phonograph record. It is at this stage that the losses by cracking occur whereupon all of the efforts of the preceding steps and the time involved are wasted, for the cracked stamper disc must be discarded.

*Summary of the invention*

It is not necessary to wait until the plated stamper disc is complete in order to deform that disc for insertion in a die. It has been discovered that when the plated master disc is prepared from the lacquer master disc, the plated master disc may be formed relatively thin. It need not be durable and thick because it is only used to form the plated mold disc. Thus, a relatively thin plated master disc may be easily deformed without any substantial risk of cracking or breaking. If such cracking or breaking does occur at this first stage of procedure, the only loss has been of the time in preparing the plated master disc and the labor involved. When the plated master disc is successfully deformed, it provides a means for preparing preshaped plated molds and stampers. Since the plated stamper so produced is preshaped, no further deformation is necessary and the plated stamper disc may be plated to a very heavy thickness. Such heavily plated stamper discs are very durable and can be made sufficiently heavy as to permit the production of two thousand five hundred records without wearing out. The heavily plated stamper disc, being preshaped, needs no deformation and is ready to be fitted into the pressing die.

The drawings are illustrative of the invention as set forth in the preferred embodiment of the inventive procedure:

Figure 1:
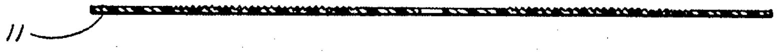
FIGURE 1 is a vertical sectional view of a lacquer master disc.
Figure 2:
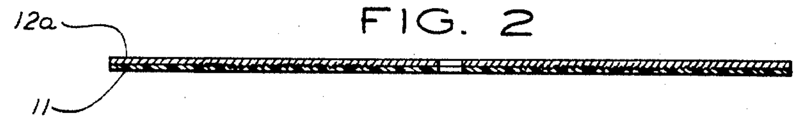
FIGURE 2 is a vertical sectional view of a plated master disc on the lacquer master disc.

Referring now to the drawings in detail:

*The first step.*—The lacquer master is prepared for plating in accordance with conventional procedures (FIGURE 1). The disc is given a coating of release material and rendered electrically conductive so that the electrodeposition may proceed. On the lacquer master 11, a plated master 12*a* is formed (see FIGURE 2).

Figure 3:
FIGURE 3 is a vertical sectional view of the plated master disc separated from the lacquer master disc, after the plated master disc has been preshaped in the configuration of the pressing die.

*The second step.*—The plated master 12*a* is removed from the lacquer master disc 11 and is placed in a die press wherein the central portion is indented to define a seat for a record label and the edges of the plated master 12*a* are rolled to produce a preshaped plated master 12*b* (FIGURE 3). The plated master 12*a* may be made relatively thin so that it may be easily crimped or deformed in a press. A relatively thick plated master disc 12*a* would be more easily fractured or broken during the deformation process. If, by chance, the preshaped plated master disc 12*b* does crack during the process of deformation, only the time and the labor of the first and second steps are lost. In contrast, if conventional procedures are followed and the shaping is left until a plated stamper is prepared, the many prior steps would be wasted.

Figure 4:
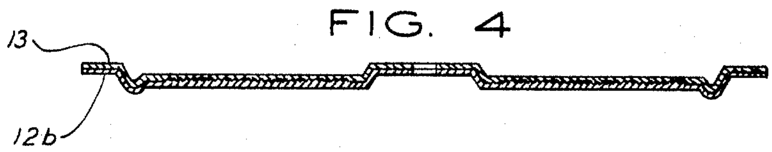
FIGURE 4 is a vertical sectional view of the preshaped plated master disc with the preshaped plated mold disc thereon.
Figure 5:
FIGURE 5 is a vertical sectional view of the preshaped plated mold disc separated from the preshaped plated master disc.

*The third step.*—The shaped plated master **12*b* is coated with the conventional release material and electrically conductive material and it is electroplated to form a preshaped mold disc 13** (see FIGURE 4).

Figure 6:
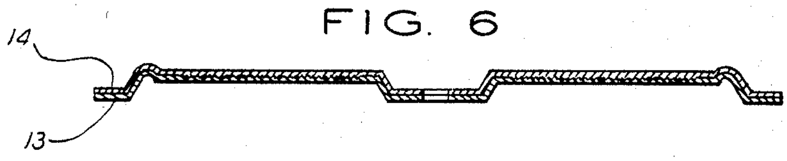
FIGURE 6 is a vertical sectional view of the preshaped mold disc with the plated stamper disc thereon.

*The fourth step.*—The preshaped plated mold disc 13 is separated from the preshaped plated master disc **12*b* and it is coated with the release material and the electrically conductive material so that it may be electroplated. It is then electroplated to form a preshaped plated stamper disc 14 (see FIGURE 6). This preshaped plated stamper disc 14 may be made very thick so that it may be used to press a great number of phonograph records before it wears out. In contrast with conventionally prepared stamper discs, which produce perhaps one hundred fifty pressings, as much as fifteen hundred phonograph records may be prepared from a heavily plated preshaped stamper disc 14** prepared in accordance with the foregoing procedures.

Figure 7:
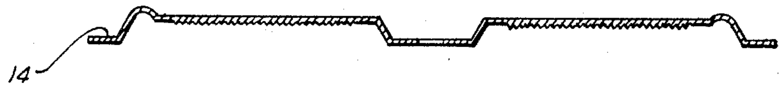
FIGURE 7 is a vertical sectional view of the preshaped plated stamper disc separated from the preshaped mold disc, preparatory to being inserted in the pressing die.

*The fifth step.*—The preshaped plated stamper disc 14 is removed from the preshaped mold (see FIGURE 7). Since it is already shaped to fit the pressing die, it is fitted into the pressing die and the mechanically grooved phonograph records are pressed until the preshaped stamper disc 14 is worn out. Additional preshaped stamper discs 14 can be prepared from the preshaped plated mold disc 13 as they may be required. Since the preshaped plated stamper discs 14 are heavy duty discs, many fewer stampers 14 need be prepared.

Although the deformation or preshaping takes place on the plated master disc 12, no substantial defects in the recording are created. If any defects there be in the plated master disc 12, they are not enhanced in the preshaped mold disc 13 nor are they further enhanced in the preshaped plated stamper disc 14. The quality of the ultimate pressing is substantially equal to the quality of the lacquer master. In addition to increased productivity, substantial economies are affected by the elimination of spoilage of stampers prepared by the conventional procedure.

The foregoing method is intended merely to be illustrative of an embodiment of the invention.

What is claimed:

1. The method of pressing mechanically grooved phonograph records comprising:
   (a) plating a master disc on a lacquer master,
   (b) reshaping the plated master disc by pressing to a shape defining a stamper disc fittable into a pressing die,
   (c) plating a preshaped mold disc on the preshaped master disc,
   (d) plating a preshaped stamper disc on the preshaped mold disc,
   (e) pressing a phonograph record from the preshaped stamper disc,
   (f) wherein the improvement consists (as in (b) supra) of the shaping of the master disc to a shape defining a preshaped stamper disc dimensioned to fit a record pressing die.

2. The method of claim 1 wherein the plated master disc is made relatively thin, sufficiently so as to be readily deformed to a shape to produce a plated stamper disc, without rupturing during deformation.

3. The method of claim 1 wherein the plated stamper disc is made relatively thick, sufficiently so as to be resistant to deformation, wear and deterioration, and rupture during the pressing of numerous records.

4. The method of claim 1 wherein the shaping of the master disc includes imparting a center concavity and rolled edges on the master disc.

5. The method of claim 1 wherein the plated stamper disc is preshaped to fit a pressing die without any deformation.

References Cited

UNITED STATES PATENTS

| | | | |
|---|---|---|---|
| 2,491,068 | 12/1949 | Adams | 204—5 |
| 2,530,842 | 11/1950 | Ruggieri | 204—5 |
| 3,227,634 | 1/1966 | Rinzema et al. | 204—5 |

ROBERT F. WHITE, *Primary Examiner.*

K. J. HOVET, *Assistant Examiner.*

U.S. Cl. X.R.

264—219; 204—5